United States Patent [19]
Dwork et al.

[11] Patent Number: 5,926,551
[45] Date of Patent: *Jul. 20, 1999

[54] SYSTEM AND METHOD FOR CERTIFYING CONTENT OF HARD-COPY DOCUMENTS

[75] Inventors: Cynthia Dwork, Palo Alto, Calif.; Moni Naor, Tel Aviv, Israel; Florian Pestoni, Buenos Aires, Argentina

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/579,750

[22] Filed: Dec. 28, 1995

Related U.S. Application Data

[51] Int. Cl.$^6$ .......................................................... H04L 9/00
[52] U.S. Cl. ................................................................. 380/51
[58] Field of Search .................................. 380/23, 25, 51

[56] References Cited

U.S. PATENT DOCUMENTS

| | | | |
|---|---|---|---|
| 4,200,770 | 4/1980 | Hellman et al. | 178/22 |
| 4,218,582 | 8/1980 | Hellman et al. | 178/22 |
| 4,405,829 | 9/1983 | Rivest et al. | 178/22.1 |
| 4,424,414 | 1/1984 | Hellman et al. | 178/22.11 |
| 4,868,877 | 9/1989 | Fischer | 380/25 |
| 4,995,082 | 2/1991 | Schnorr | 380/23 |
| 5,001,752 | 3/1991 | Fischer | 380/23 |
| 5,005,200 | 4/1991 | Fischer | 380/30 |
| 5,136,647 | 8/1992 | Haber | 380/49 |
| 5,157,726 | 10/1992 | Merkle | 380/23 |
| 5,222,138 | 6/1993 | Balabon et al. | 380/51 |
| 5,231,668 | 7/1993 | Kravitz | 380/28 |
| 5,444,779 | 8/1995 | Daniele | 380/3 |
| 5,465,299 | 11/1995 | Matsumoto | 380/23 |
| 5,553,145 | 9/1996 | Micali | 380/30 |

FOREIGN PATENT DOCUMENTS

0214609A2  3/1986  European Pat. Off. .......... H04L 9/00

OTHER PUBLICATIONS

C. Dwork, M. Naor, An Efficient Existentially Unforgeable Signature Scheme and its Applications, Advances in Cryptology–CRYPTO '94, 14th Annual International Cryptology Conference, Santa Barbara, California, pp. 234–246, Aug. 1994.

S. Goldwasser et al., "A Digital Signature Scheme Secure Against Adaptive Chosen–message Attacks", SIAM Journal of Computing, vol. 17, No. 2, Apr. 1988, pp. 281–308.

W. Diffie et al., "New Directions in Cryptography", *IEEE Transactions on Information Theory*, vol. IT–22, No. 6, Nov. 1976, pp. 644–654.

*Primary Examiner*—Salvatore Cangialosi
*Attorney, Agent, or Firm*—James C. Pintner; Gunster, Yoakley, Valdes-Fauli & Stewart

[57] ABSTRACT

A system and method are provided for facilitating proof that a specific item, such as a document, has been sent via a communication medium, such as the mail service of the United States Postal Service, at a specific time. A bit map image is produced, such as by scanning a hard copy document. Preferably the bit map is compressed into a data string and hashed. The hash file is signed by a certifying authority, such as the USPS, using an existentially unforgeable signature scheme. The original document, a code representation of the string, and a code representation of the signature are sent via the communication medium. As a result, the combination of materials sent provides proof of the authenticity of the content of the document.

23 Claims, 2 Drawing Sheets

SYSTEM AND METHOD FOR CERTIFYING CONTENT OF HARD-COPY DOCUMENTS

FIELD OF THE INVENTION

The invention generally relates to the field of digital communication. More specifically, the invention relates to authentication of digital transmissions.

BACKGROUND OF THE INVENTION

The digital electronic communication medium is becoming an increasingly common substitute for traditional forms of communication, such as the hard-copy mail medium. For example, the Internet is a common medium for electronic mail "E-mail" messages between humans. In fact, the humorously disparaging term "snail mail" has recently been used to refer to traditional hand-delivered hard-copy mail services.

However, hard-copy communication media, such as hard-copy mail service provided by the United States Postal Service, are alive and well. Moreover, the development of electronic communication has, in some ways, been beneficial for traditional hard-copy mailing. Certain differences between electronic and hard-copy forms of communication are becoming more apparent, and it is possible to recognize advantages and disadvantages of one over the other. At the same time, by recognizing an advantage of one medium, it is possible to develop previously unused ways of realizing similar advantages in the other Consider, for instance, the general field of authentication of posting of a message. Hard-copy mail has traditionally provided, through postmarking of a piece of mail, a representation that the mail was posted on the date of postmarking. Additionally, mail may be certified, at the request of the sender and for a suitable fee. Thus, certain types of important mail which must be mailed by a required date, such as Internal Revenue Service tax forms, can be certified as to the date of posting.

However, this familiar process of certifying a piece of hard-copy mail has a significant limitation. Certification as described above proves that some item of mail was posted on the day of posting. It does not prove, however, that any particular item of mail, having any particular content, was posted. To accomplish this latter proof, it is necessary to certify the content of the document.

Certain types of certification have been made available in the context of electronic communication. For example, the related problem of certifying the identity of a sender has been dealt with. See, for instance, Fischer, U.S. Pat. No. 4,868,877, "Public Key/Signature Cryptosystem with Enhances Digital Signature Certification". However, the Fischer '877 patent pertains only to electronic communication and cryptography, and does not address the problem of certifying either content in general, or content of a hard-copy document in particular.

Thus, there is a drawback to the certification of hard-copy mail, in that the content of the mail item cannot be certified. This drawback has not been adequately solved by existing techniques, such as those discussed above.

SUMMARY OF THE INVENTION

It is therefore an object of the invention to provide a method and system, for use with hard-copy mail, for certifying the content, as well as the mere fact of posting, of the mail item.

To achieve this and other objectives, there is provided in accordance with the invention a method for certifying content of a data object, the method comprising the following steps:

First, a digital representation of the data object is produced. Typically, for hard-copy documents, this is done by scanning the hard-copy document to produce a two-dimensional bit map.

Then, a signature for the digital representation is obtained from a certifying agent. The signature is produced as a function of the digital representation of the data object, so as to reflect the content of the data object This step will commonly be performed by a certifying agent, such as a post office clerk or a notary public.

Finally, as a result of the previous steps, a representation of the signature, along with the data object, is provided. Accordingly, it is established that the signature authenticates the content of the data object.

Additionally, the above process can incorporate date and time information, such as by concatenation of the date/time information with a digital file representative of the document's content.

The invention, as described and claimed below, provides customers of hard-copy communication services, such as United States Postal Service customers, with a service not heretofore available. Customers now will be able to certify the content, as well as the fact of mailing, of posted documents. The result will be an enhanced confidence, on the part of customers, that mailing requirements have been demonstrably complied with. Also, disputes between senders and recipients as to whether mailing requirements had been met will no longer come up. The old cliché "the check is in the mail" will now be a demonstrable fact.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

Figure 1:
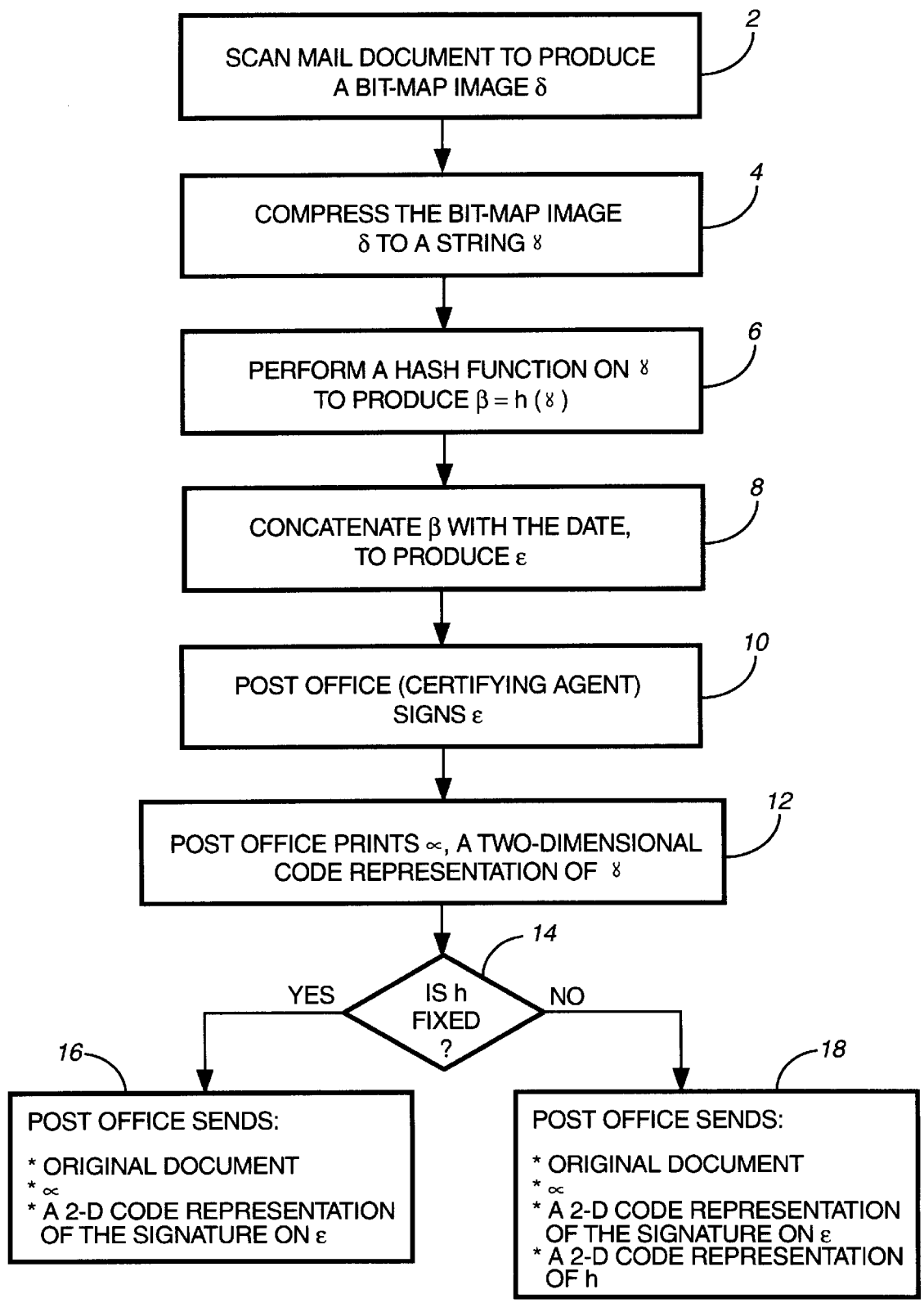
FIG. 1 is a block diagram of a system in accordance with the invention.

The description which follows will be presented in terms of the scenario that a hard-copy document, such as an IRS form, is to be mailed and content-certified in accordance with the invention. However, it will be understood that the method of the invention can also be used with other forms of mail traffic. For instance, the original document to be mailed might be in electronic form, such as an image in data file format, or a document generated electronically, such as a word-processed document having a mixture of text characters and embedded command flags for formatting, etc.

The term "document" will be used to refer, without limitation, to any such hard-copy, electronic, or other material which is to be content-certified, and which has either a visually observable image (such as any hard-copy document) or a representation equivalent to an image (such as an electronically stored combination of representations of text characters (e.g., ASCII code) and command flags which dictate the appearance of a resultant printout (e.g., font information, margin information, etc.).

Also, the scenario of the discussion is that a communication agent of the sender transports the document to the recipient, and performs suitable activities for content certification in accordance with the invention. For the purpose of the present description of the invention, this communication agent is designated as the "post office." It will be understood, however, that in addition to the United States Postal Service (USPS), other carriers such as commercial overnight services, etc., may serve the functions here attributed to the post office. Also, other forms of communication, such as electronic communication, may be used, as appropriate.

Additionally, it will be understood that the party which certifies the content of the document (step 10, described in detail below) need not also transport the document. For example, a notary public might sign the document to certify its content, as per step 10, below. If there is a need to transport the document, then, another party, a communication agent or post office, actually transports the document.

It will also be understood that content certification in accordance with the invention may take place independently of any transportation or communication of the document. Thus, a party having a document to be content-certified may do so using his or her own equipment (to be described below), or may seek an appropriate certifying agent, who has the appropriate equipment for practicing the method of the invention, and who is not necessarily in the business of communicating or transporting documents or other types of messages.

In view of the preceding three paragraphs, the terms "certifying agent" and "post office" will be used to refer to any party, other than the owner of the document to be certified, which actually performs the certification according to the invention.

However, it is believed that the invention will most commonly be practiced in connection with the USPS or a private carrier. In these most likely scenarios, the document will be transported or otherwise communicated from a sender to a recipient by a communication agent, and the communication agent will also be the party which certifies the content of the document. Therefore, it is believed that the use of the term "post office" for the certifying agent, will facilitate the understanding of the invention in terms of a likely scenario for the invention's practice, while it will be understood that the rerm "post office" is not, and is not intended to be, limiting as to who practices the invention, or in what context it is practiced.

DESCRIPTION OF THE METHOD OF THE INVENTION (FIG. 1)

A method in accordance with the invention is shown, in flowchart form, in FIG. 1.

Initially, a bit digital representation of the document, in bit map form, is produced (step 2). This may be done by scanning a hard-copy document, such as by a FAX scanner. If the original document is an electronic text-processed file, step 2 may be implemented by formatting the text file with embedded commands into a "what-you-see-is-what-you-get" (WYSIWYG) file.

For the purpose of this discussion and for illustrative purposes, the bit map file is designated "$\delta$".

Once the bit map file $\delta$ is obtained or generated through scanning or other processing, the bit map file $\delta$ may then be processed. In the preferred embodiment of the method of the invention shown in FIG. 1, the processing includes compressing the bit map image file $\delta$ to produce a string, designated "$\gamma$" (step 4), and performing a hash function on the string $\gamma$ to produce a hashed file, designated "$\beta$" (step 6). However, processing may be done in other forms, as appropriate to the particular form of document which is to be content-certified, and to the form of tramsportation, if any, to which the content-certified document is to be subjected.

Since certification of a posted document often includes certification of the mailing date, the method includes concatenating the date with the file. In the preferred embodiment, this is done after the file has been hashed in step 6. As shown in step 8, the hashed file $\beta$ is concatenated with the date, to form a file designated "$\epsilon$".

When a file is produced, such as by the method discussed above, derived from the content of the file and, if desired, from the date, it is then signed by the Post Office or other communication agent (step 10).

A signature scheme preferably should be used which is existentially unforgeable. The term "existentially unforgeable" is defined, formally, as follows: Where S(m) denotes a signature on a message m, given any polynomial (in the sceurity parameter) number of pairs of messages and signatures $$\{ (m_1, S(m_1)), (m_2, S(m_2)), \ldots (m_k, S(m_k)) \},$$

the signature scheme S is existentially unforgeable if, for any message $m_{k+1}$, which is not an element of the set of messages $m_1$ through $m_k$, it is computationally infeasible to generate a message/signature pair $(m_{k+1}, S(m_{k+1}))$ A preferred signature method is that disclosed in Dwork et al., "An Efficient Existentially Unforgeable Signature Scheme and its Applications", published in Desmect (Ed.), Advances in Cryptology—CRYPTO '94, 14th Annual Cryptology Conference, Santa Barbara, Calif. (Aug. 21–25, 1994).

The post office now has all the files needed for content-certified mailing. In step 12, the post office produces a hard copy for mailing, In the above method, preferably the compressed string $\gamma$ is printed out. More specifically, the post office preferably generates a two-dimensional code representation of the string $\gamma$, and prints it out as a hard copy. The two-dimensional code representation is preferably in a form which can be affixed to the face of the document. A bar code, or comparable two-dimensional code, is a preferred form of this representation.

At this point, the computations, and the generation of the various data objects, etc., necessary for the content certification according to the invention, are completed. There remains the task of producing a package of information representative of the content certification of the package. For instance, if the data object to be content-certified is a hard-copy document which is to be sent to a recipient (e.g., a tax form to be sent to the IRS), the package includes the hard-copy document itself, and additional hard-copy items representing the content certification, which will then be mailed out as a package.

In so doing, the method of the invention proceeds in one of two ways, depending on whether the hashing function h used in step 6 is fixed, that is, whether the hash function is in any way a function of time. To represent this contingency, FIG. 1 includes a test, step 14, for whether the hashing function h is fixed.

If the hashing function h is fixed, then the post office proceeds as in step 16. The post office sends, both to the recipient and to the sender as a receipt, the following items: First, the original document is sent, either in the original hard copy form, or as a hard copy printout.

Second, the post office sends the code representation of the document which was produced in step 4. Third, the post office sends a code representation of the post office's signature on the concatenation of the document and the date, produced in step 12. Thus, the content of the document is reflected in both of the two code reprsentations, as well as being given in the document itself.

If, on the other hand, the hashing function is not fixed, then the post office proceeds to step 18. Step 18 directs the post office to send all the items listed in step 16, and additionally to send a two-dimensional code representation of the hashing function h.

DESCRIPTION OF A SYSTEM FOR PRACTICING THE INVENTION (FIG. 2)

Figure 2:
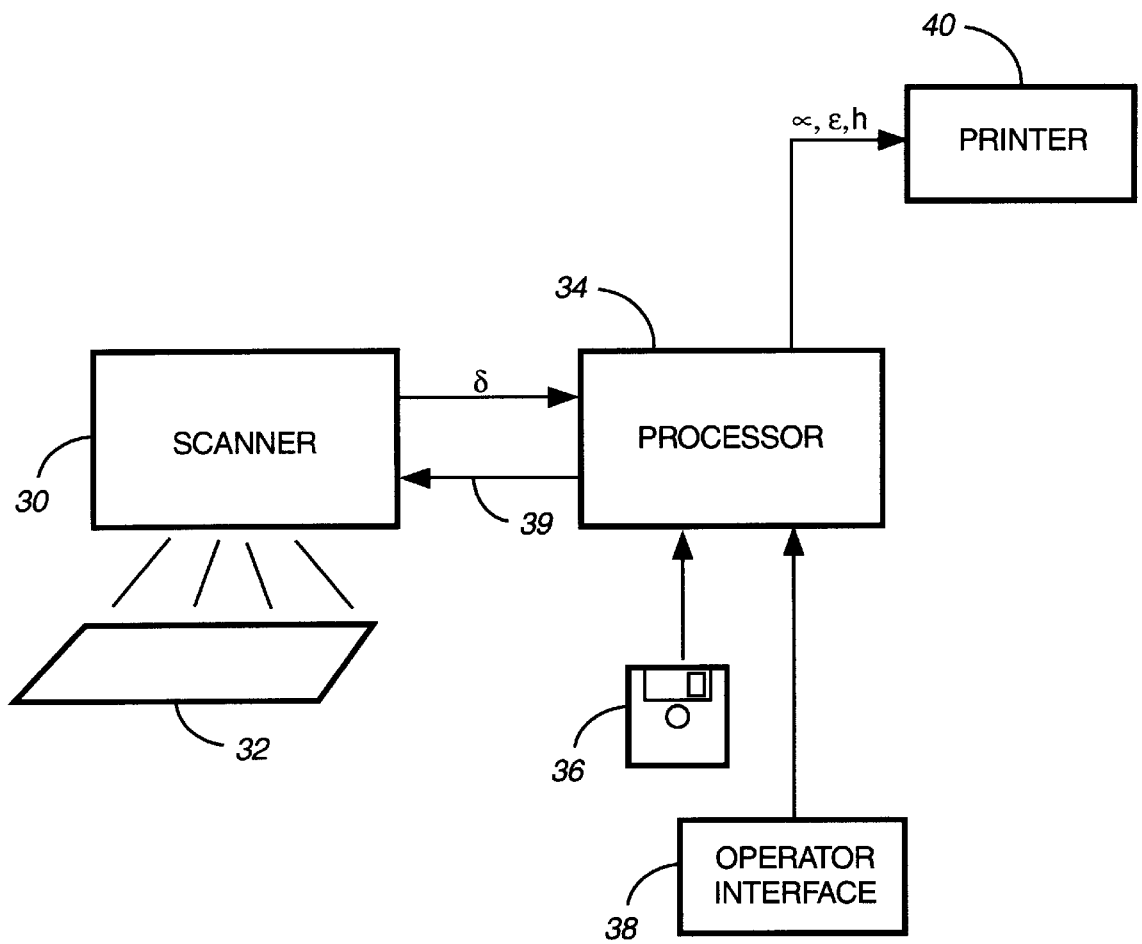
FIG. 2 is a flowchart of a method in accordance with the invention.

A system in accordance with the invention is shown in FIG. 2. The system of FIG. 2 shows equipment which would be in the possession or control of the certifying agent or communication agent. This equipment is preferably on site in a post office, for convenient use by its customers. A suitable human official, such as a USPS clerk or a notary public, may be the party that signs the document as in step 10 of FIG. 1. Alternatively, the system according to the invention may be embodied as a piece of office equipment, available for use by office employees for documents to be mailed out later. The invention could also be in the form of commercially available program code, for use with a general purpose computer having suitable peripheral equipment as per the description below.

The system of FIG. 2 includes a scanner 30 for scanning a document 32 provided by a sender. The scanner 30 outputs the bit map image δ, as described above. Where the document to be content-certified is provided in electronic form, the scanner is replaced by suitable electronic input/output equipment for providing an equivalent bit map image file, such as a floppy disk reader, or other storage or I/O interface equipment.

The bit map image δ is provided to a processor 34, which can be a suitably programmed computer or processing device. The programming causes the processor 34 to execute the compression step 4 and the hashing step 6.

The processor 34 preferably includes a calendar and clock arrangement, as is commonly found in computers. Thus, the date and/or time is available to the processor 34 for use with the step 8 of concatenating the date.

The processor may be a general purpose computer, executing program code for implementing the above-described method of the invention. The code may be obtained by the communication agent and provided to the processor 34 on a commercially available computer program product, such as a pre-recorded floppy disk 36. In FIG. 2, the floppy disk 36 is shown with an arrow, which schematically represents the insertion of the disk 36 into a suitable disk drive of the processor 34, which allows the processor 34 to read and execute the program code on the disk 36.

Alternatively, as the so-called "information superhighway" makes software available for downloading from servers to customers/users, the program code may be provided to the processor 34 from a server through a computer usable medium such as the Internet. In such a case, the floppy disk 36 is replaced by a suitable Internet interface.

An operator interface 38 is provided, to allow the user to initiate and control operation of the system. The interface 38 may also be used by the certifying agent for signing, as per step 10. In a preferred architecture, the operator interface 38 interfaces with the processor 34. The processor 34 executes suitable user interface and control software included on the computer program product 36. Also, a control line 39 is provided to allow the processor 34 to control operation of the scanner 30.

Finally, a printer 40 is provided. As shown, a, the code representation of the string γ, is sent from the processor 34 to the printer 40 for printing. Also, the code representation of the signature on ε, the concatenation of the hashed file and the signature, is also printed. Thus, the printer 40 provides the necessary hard copies for step 16. Also, where the hash function h is not fixed, the two-dimensional code representation of the hash function is also printed, as per step 18.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for certifying content of a hard-copy document for dispatch using physical delivery from a sender to a recipient, the method comprising the steps of:

producing a digital representation of a hard-copy document at a certifying agent;

obtaining a digital signature for the digital representation of the hard-copy document from the certifying agent using an existentially unforgeable signature scheme, the digital signature being a function of the digital representation of the hard-copy document; and at the certifying agent, the certifying agent providing
 a physical representation of the digital signature, and
 a physical representation of the digital representation of the hard-copy document, as proof that the content of the hard-copy document was certified by the certifying agent at dispatch for physical delivery of the hard-copy document from a sender to a recipient.

2. A method as recited in claim 1, wherein the step of producing includes the step of scanning the hard-copy document to generate a bit-map image of the hard-copy document.

3. A method as recited in claim 2, wherein the step of producing further includes the steps of:

compressing the bit-map image to generate a data string; and performing a hash function on the string to generate a hashed file.

4. A method as recited in claim 1, wherein:

the method further comprises the step of concatenating date information with the digital representation of the hard-copy document; and the step of obtaining a digital signature is performed on the concatenation of the date information and the digital representation of the hard-copy document, the digital signature being a function of the digital representation of the hard-copy document concatenated with the date information.

5. A method as recited in claim 3, wherein:

the method further comprises the step of concatenating date information with the hashed file; and the step of obtaining a digital signature is performed on the concatenation of the date information and the hashed file, the digital signature being a function of the hashed file concatenated with the date information.

6. The method as recited in claim 1, further comprising the step of providing a physical package including
the hard-copy document, the physical representation of the digital signature, and the physical representation of the digital representation of the hard-copy document, for physical delivery of the package from a sender to a recipient.

7. A method as recited in claim 1, wherein:
the hard-copy document is to be physically delivered from a sender to a recipient by means of a physical communication agent; and
the step of obtaining a digital signature includes obtaining the digital signature from the physical communication agent, the physical communication agent being the certifying agent.

8. The method as recited in claim 7, wherein:
the physical communication agent comprises a representative of a carrier service providing hard-copy document physical delivery functions attributed to a post office.

9. The method as recited in claim 6, wherein
the physical representation of the digital signature is a two-dimensional code representation of the digital signature that is printed on a hard-copy document, and wherein
the physical representation of the digital representation of the hard-copy document is a two-dimensional code representation of the digital representation of the hard-copy document that is printed on a hard-copy document, and wherein
the package includes the hard-copy document, the two-dimensional code representation of the digital signature printed on a hard-copy document, and the two-dimensional code representation of the digital representation of the hard-copy document printed on a hard-copy document.

10. A system for certifying content of a hard-copy document for dispatch using physical delivery from a sender to a recipient, the system comprising:
means for producing a digital representation of the hard-copy document;
means for obtaining a digital signature for the digital representation of the hard-copy document from a certifying agent using an existentially unforgeable signature scheme, the digital signature being a function of the digital representation of the hard-copy document; and
means for providing a physical representation of the digital signature and a physical representation of the digital representation of the hard-copy document as proof that the content of the hard-copy document was certified by the certifying agent at dispatch for physical delivery of the hard-copy document from a sender to a recipient.

11. A system as recited in claim 10, wherein the means for producing includes means for scanning the hard-copy document to generate a bit-map image of the hard-copy document.

12. A system as recited in claim 11, wherein the means for producing further includes:
means for compressing the bit-map image to generate a data string; and
means for performing a hash function on the string to generate a hashed file.

13. A system as recited in claim 10, wherein:
the system further comprises means for concatenating date information with the digital representation of the hard-copy document; and the means for obtaining a digital signature is operable on the concatenation of the date information and the digital representation of the hard-copy document, the digital signature being a function of the digital representation of the hard-copy document concatenated with the date information.

14. A system as recited in claim 12, wherein:
The system further comprises means for concatenating date information with the hashed file; and
the means for obtaining a digital signature is operable on the concatenation of the date information and the hashed file, the digital signature being a function of the hashed file concatenated with the date information.

15. The method as recited in claim 10, further comprising means for providing a physical package including
the hard-copy document, the physical representation of the digital signature, and the physical representation of the digital representation of the hard-copy document, for physical delivery of the package from a sender to a recipient.

16. A system as recited in claim 10, wherein:
the hard-copy document is to be physically delivered from a sender to a recipient by means of a physical communication agent; and
the means for obtaining a digital signature includes means for obtaining the digital signature from the physical communication agent, the physical communication agent being the certifying agent.

17. The method as recited in claim 15, wherein
the physical representation of the digital signature is a two-dimensional code representation of the digital signature that is printed on a hard-copy document, and wherein
the physical representation of the digital representation of the hard-copy document is a two-dimensional code representation of the digital representation of the hard-copy document that is printed on a hard-copy document, and wherein
the package includes the hard-copy document, the two-dimensional code representation of the digital signature printed on a hard-copy document, and the two-dimensional code representation of the digital representation of the hard-copy document printed on a hard-copy document.

18. A computer program product, for use with a processing system, for certifying content of a hard-copy document for dispatch using physical delivery from a sender to a recipient, the computer program product comprising:
a computer-usable medium;
means, provided on the computer usable medium, for directing the processing system to produce a digital representation of the hard-copy document;
means, provided on the computer usable medium, for directing the processing system to obtain a digital signature for the digital representation of the hard-copy document from a certifying agent using an existentially unforgeable signature scheme, the digital signature being a function of the digital representation of the hard-copy document; and
means, provided on the computer usable medium, for directing the processing system to provide a physical representation of the digital signature and a physical representation of the digital representation of the hard-copy document as proof that the content of the hard-copy document was certified by the certifying agent at dispatch for physical delivery of the hard-copy document from a sender to a recipient.

19. A computer program product as recited in claim 18, wherein the means for directing to produce includes means, provided on the computer usable medium, for directing the processing system to scan the hard-copy document to generate a bit-map image of the data object.

20. A computer program product as recited in claim 19, wherein the means for directing to produce further includes:

means, provided on the computer usable medium, for directing the processing system to compress the bit-map image to generate a data string; and means, provided on the computer usable medium, for directing the processing system to perform a hash function on the string to generate a hashed file.

21. A computer program product as recited in claim 18, wherein:

the computer program product further comprises means, provided on the computer usable medium, for directing the processing system to concatenate date information with the digital representation of the hard-copy document; and the means for directing to obtain a digital signature is operable on the concatenation of the date information and the digital representation of the hard-copy document, the digital signature being a function of the digital representation of the hard-copy document concatenated with the date information.

22. A computer program product as recited in claim 20, wherein:

the computer program product further comprises means, provided on the computer usable medium, for directing the processing system to concatenate date information with the hashed file; and the means for directing to obtain a digital signature is operable on the concatenation of the date information and the hashed file, the digital signature being a function of the hashed file concatenated with the date information.

23. A computer program product as recited in claim 18, wherein:

the hard-copy document is to be physically delivered from a sender to a recipient by means of a physical communication agent; and the means for directing to obtain a digital signature includes means, provided on the computer usable medium, for directing the processing system to obtain the digital signature from the physical communication agent, the physical communication agent being the certifying agent.

* * * * *